Feb. 24, 1948.  G. FAIRBANKS  2,436,508
MACHINE MOUNTED HOOD DEVICE FOR PROTECTING ATTENDANTS FROM DUST
Filed March 18, 1947  2 Sheets-Sheet 1

INVENTOR.
Glen Fairbanks
BY Victor J. Evans & Co.
ATTORNEYS

Feb. 24, 1948. G. FAIRBANKS 2,436,508
MACHINE MOUNTED HOOD DEVICE FOR PROTECTING ATTENDANTS FROM DUST
Filed March 18, 1947 2 Sheets-Sheet 2
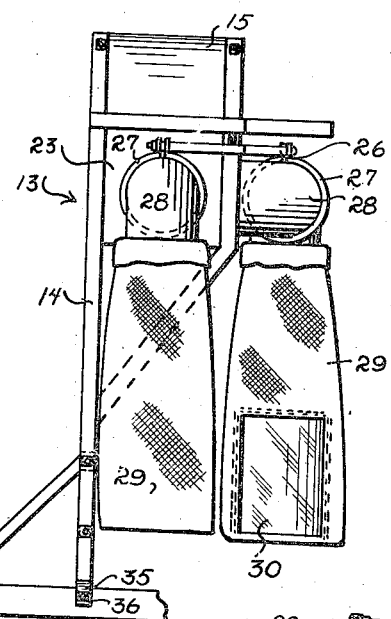
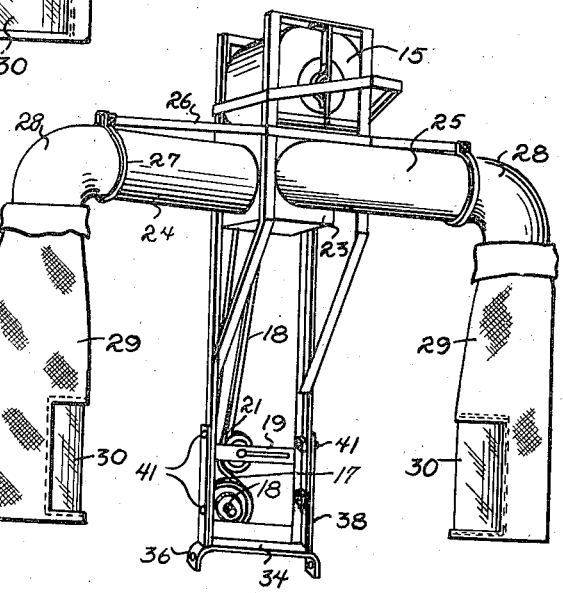
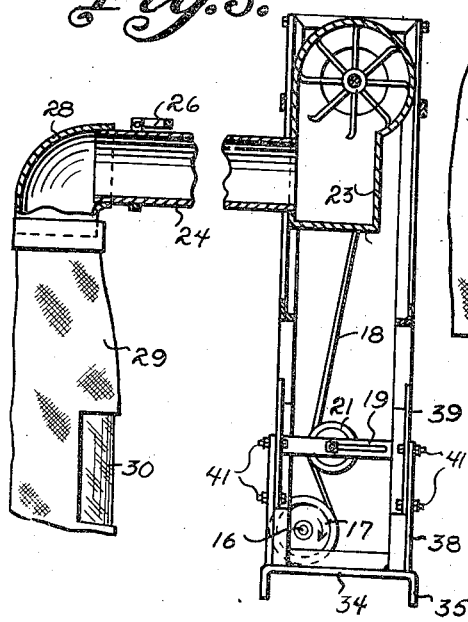
INVENTOR.
Glen Fairbanks
BY Victor J. Evans & Co.
ATTORNEYS Patented Feb. 24, 1948

2,436,508

UNITED STATES PATENT OFFICE 2,436,508

MACHINE MOUNTED HOOD DEVICE FOR PROTECTING ATTENDANTS FROM DUST

Glen Fairbanks, Twin Falls, Idaho, assignor of one-half to Edward Babcock, Twin Falls, Idaho Application March 18, 1947, Serial No. 735,449

3 Claims. (Cl. 98—115)

This invention relates to a dust removing and air conditioning device for use by workmen stationed on a piece of farm equipment such as a hay baler.

It is an object of the present invention to provide a dust removing and air conditioning device for use by workmen seated upon a piece of farm equipment so that they may breathe fresh air free of dust and other particles surrounding them and wherein the attachment is of light weight and easy to be connected to a piece of farm equipment and to be driven by the same.

Other objects of the present invention are to provide a dust removing and air conditioning device for farm machinery which is of simple construction, inexpensive to manufacture and efficient in operation.

For other objects and for a better understanding of the invention, reference may be had to the following detailed description taken in connection with the accompanying drawing, in which Fig. 1 is a rear elevational view of a piece of farm equipment on which is mounted the dust removing and air conditioning device of the present invention adapted to extend from a high point to a point below and over the heads of the workmen on the farm machine.

Fig. 2 is a side elevational view of the dust removing and air conditioning device.

Fig. 3 is an end elevational view of the device with a portion broken away to show the interior thereof.

Fig. 4 is a perspective view of the device.

Figure 1:
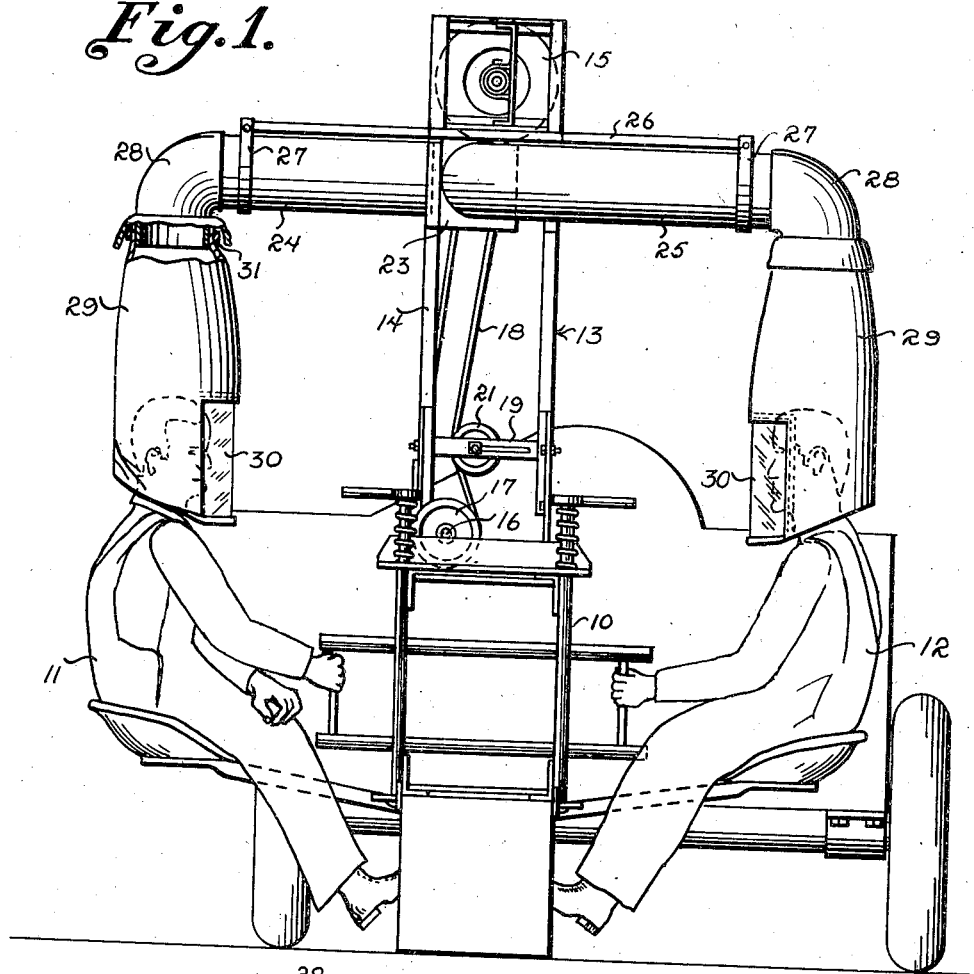
Figure 5:
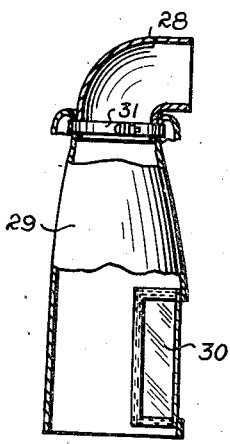
Fig. 5 is an elevational view of the hood adapted to extend over the head of the workman with portions broken away to show the interior thereof and the manner in which it is connected to the piping which extends from the blower.

Referring now to the figures, 10 represents a piece of farm machinery such as a hay baler adapted to be trailed behind a tractor for the purpose of baling such hay as is picked up by the machine. In order to operate the machine it is necessary that two workmen 11 and 12 be carried on the machine at opposite sides thereof in order to provide the wires for securing the baled hay together. Throughout the course of operation of the hay baler a great deal of dust and other particles are stirred up which prevent the workmen from breathing clear and fresh air. Accordingly, there has been provided a dust removing and air conditioning attachment 13 adapted to be fixed to the top of the hay baler 10 and adapted to supply fresh air to the heads of the workmen. This attachment 13 comprises a frame 14 adapted to be attached to the top of the hay baler so as to extend upwardly and which has a blower 15 on the top of the same. Power can be taken from the baler through a shaft 16 to drive a pulley 17 thereon and over which there is extended a pulley belt 18 which connects with the blower 15 to drive the same. Extending from one side of the frame 14 to the other is a transverse supporting piece 19 for an idler pulley 21 which can be adjusted therealong to tighten the belt 18. The blower 15 has a drop housing 23 to which are connected blower pipes 24 and 25 which extend laterally to the opposite sides of the hay baler 10. The pipes are supported by a transversely extending member 26 having rings 27 thereon surrounding the outer ends of the pipe. Elbow members 28 extend downwardly from the ends of the pipes. To these elbow members there are respectively connected hoods 29 having windows 30 therein through which a workman can gaze upon the work located at the level of the workman's head. The hoods 29 extend down over the heads so that their lower edges are raised only slightly above the shoulders of the workmen. The hoods 29 are of flexible material such as canvas and are connected at their upper ends to the elbow members by clamping rings 31. Air is taken in at the top of the device through the blower and is blown downwardly over the heads of the workmen so as to force out of the hoods 29 any dust or the like which may tend to raise upwardly over the workmen's head and whereby the workmen will be supplied with fresh air at all times. The air is taken from a high elevation where there is little dust and delivered downwardly to a low elevation for the workmen to breathe.

Referring now particularly to Figs. 3 and 4, it will be noted that there has been provided a foot member 34 of inverted U-shape and having downwardly bent ends 35 with holes 36 therein through which bolts can be extended for the attachment of the device to the farm machine. A brace 37 will retain the frame 14 in its vertically extended position. In order that the frame can be adjusted to different vertical levels, the frame has been made of two parts in which the inverted U-shaped member 34 is of one part and has angle pieces 38 extending upwardly therefrom. Cooperating angle pieces 39 are provided on the frame and can be attached to any vertical position depending upon the holes within the frame pieces 39 or 38, by attaching bolts 41. Or, the bottom part including the member 34 can be removed and a different bottom part which may fit better a different machine, can be installed upon the bottom end of the frame. In other words, different attaching pieces can be connected to the frame to render the device adaptable for different form machines.

While various changes can be made in the detail construction, it shall be understood that such changes shall be within the spirit and scope of the present invention as defined by the appended claims.

I claim:

1. A dust removing and air conditioning device for farm machines which comprises a frame adapted to be connected to a farm machine and to extend upwardly to a high elevation, a blower connected to the top of the frame, drive means extending downwardly from the blower and adapted to be connected to a moving part of the machine whereby the blower will be operated, and transversely extending pipes extending from the blower toward the sides of the machine, bracing means extending from the frame to support the outer ends of the pipes, and means including hoods depending from the outer ends of the pipes through which fresh air from the blower will be delivered, said hood being of flexible material and adapted to be extended over the heads of workmen on the machine, said hoods having windows through which the workmen can gaze.

2. A dust remover and air conditioner for farm machines as defined in claim 1, and said frame having a removable attaching piece whereby the attachment can be adapted for use with different machines.

3. A dust removing and air conditioning device for farm machines as defined in claim 1, and said means depending from the end of the laterally extending pipe comprising elbow members, and said hoods being detachably connected to the lower end of the elbow members.

GLEN FAIRBANKS.

REFERENCES CITED

The following references are of record in the file of this patent:

UNITED STATES PATENTS

| Number | Name | Date |
|---|---|---|
| 642,166 | Sherman | Jan. 30, 1900 |
| 1,401,710 | Koterske | Dec. 27, 1921 |